(12) United States Patent
Fleming et al.

(10) Patent No.: US 7,249,352 B2
(45) Date of Patent: Jul. 24, 2007

(54) APPARATUS AND METHOD FOR REMOVING ELEMENTS FROM A LINKED LIST

(75) Inventors: Matthew David Fleming, Austin, TX (US); Jonathan Allen Wildstrom, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 10/227,517

(22) Filed: Aug. 22, 2002

(65) Prior Publication Data

US 2004/0040018 A1 Feb. 26, 2004

(51) Int. Cl.
*G06F 9/44* (2006.01)

(52) U.S. Cl. ............ 717/162; 717/165; 712/203; 712/204; 712/205; 711/123; 711/125

(58) Field of Classification Search ............ 707/103, 707/206, 103 R; 714/13; 709/206, 224–237; 717/162–165; 712/203–205; 711/123–125
See application file for complete search history.

(56) References Cited

U.S. PATENT DOCUMENTS

| | | | |
|---|---|---|---|
| 4,779,188 A | 10/1988 | Gum et al. | 364/200 |
| 5,237,694 A | 8/1993 | Horne et al. | 395/725 |
| 5,603,005 A | 2/1997 | Bauman et al. | 395/451 |
| 5,790,398 A | 8/1998 | Horie | 364/133 |
| 6,044,438 A | 3/2000 | Olnowich | 711/130 |
| 6,052,699 A * | 4/2000 | Huelsbergen et al. | 707/206 |
| 6,687,788 B2 * | 2/2004 | Vorbach et al. | 711/122 |
| 6,748,453 B2 | 6/2004 | Law et al. | |
| 6,751,721 B1 | 6/2004 | Webb, Jr. et al. | 712/10 |
| 2001/0047361 A1 * | 11/2001 | Martin et al. | 707/103 R |
| 2002/0078322 A1 | 6/2002 | Gunzinger | 712/29 |

(Continued)

OTHER PUBLICATIONS

Short, "Embedded Microprocessor Systems Design, An Introduction Using the Intel 80C188EB", Prentice Hall, 1998, ISBN 0-13-249467-1, p. 465.

*Primary Examiner*—Meng-Al T. An
*Assistant Examiner*—Mark P. Francis
(74) *Attorney, Agent, or Firm*—Duke W. Yee; Diana R. Gerhardt; Stephen R. Tkacs (57) ABSTRACT

Methods, apparatus and computer program products for removal of elements from a linked list while other elements of the linked list are allowed to be accessed during the removal operation. In one embodiment, the method, apparatus and computer program product include identifying an add/remove area of a linked list and a static area of the linked list. Elements may only be added or removed from the linked list in the add/remove area or by a garbage collector that performs garbage collection only on elements in the static area of the linked list. The garbage collector identifies an element after the last element in the add/remove area and performs garbage collection beginning with that element and moving through the static area. In an alternative embodiment, a "next element" pointer in a previous list element is set to point to the element being deleted's "next element" pointer. Any global references to the element being deleted must be modified. A message may then be issued to the processors of a multiprocessor system at a same interrupt priority as a reading process priority. Once the processors respond to the message, garbage collection may be performed on the element to be deleted.

40 Claims, 6 Drawing Sheets

U.S. PATENT DOCUMENTS

| | | |
|---|---|---|
| 2002/0099833 A1 | 7/2002 | Steely, Jr. et al. .......... 709/228 |
| 2003/0140139 A1* | 7/2003 | Marejka et al. ............. 709/224 |
| 2003/0154301 A1* | 8/2003 | McEachem et al. ........ 709/237 |
| 2003/0204775 A1* | 10/2003 | Wisler et al. ................. 714/13 |

* cited by examiner

APPARATUS AND METHOD FOR REMOVING ELEMENTS FROM A LINKED LIST

BACKGROUND OF THE INVENTION

1. Technical Field

The present invention generally relates to removal of elements from a linked list. In particular, the present invention provides apparatus and methods for removing elements from a linked list while allowing access to other elements of the linked list during the removal.

2. Description of Related Art

In data management, a linked list is a group of items, each of which contains a pointer to the next item. A linked list allows for the organization of a set of data in noncontiguous storage locations. Linked lists are used in many types of computing environments and are used for the management of various types of data.

One computing environment in which linked lists may be utilized is a multiprocessor system. In a multiprocessor system a plurality of processors may attempt accesses and/or modifications to elements in the linked list at substantially the same time. Thus, there is a system of locks utilized to make sure that only a single processor may access and/or modify a particular element in the linked list at one time. If such a mechanism were not used, two or more different processors may perform conflicting actions on the linked list element or the action of one processor on the linked list element may be negatively impacted by the actions performed by the other processors.

This problem is further exacerbated when elements need to be removed from the linked list, e.g., elements that are no longer being used by any of the processors (garbage collection). It is important, however, during such removal of elements of a linked list in a multiprocessor system, that elements are not modified or removed that are or may be utilized by one or more of the processors during the removal process.

In known mechanisms for removal of elements in a linked list, the list is protected from any changes at all times during the removal process. Such an approach has the disadvantage that it will synchronize all accesses to the list, making multiprocessor use of the list prohibitively slow. Another common way of handling such removal of elements is to have a second linked list that maintains elements to be freed, i.e. deferred freeing of the elements, and free the entire second list at once. Unfortunately, this implementation requires the element be removed from the first list by, again, locking the linked list and adjusting pointers in the linked list elements to remove the element. Thus, in all known mechanisms for removing elements from a linked list, a lock of the linked list is required and serialization of accesses to the linked list results.

Therefore, it would be beneficial to have an apparatus and method for removing elements from a linked list that allows access to elements of the linked list during removal of other elements of the linked list. In this way, serialization of accesses to the linked list are avoided.

SUMMARY OF THE INVENTION

The present invention provides a method, apparatus and computer program product for removal of elements from a linked list while other elements of the linked list are allowed to be accessed during the removal operation. In one embodiment, the method, apparatus and computer program product include identifying an add/remove area of a linked list and a static area of the linked list. Elements may only be added or removed from the linked list in the add/remove area or by a garbage collector that performs garbage collection only on elements in the static area of the linked list. The garbage collector identifies an element after the last element in the add/remove area and performs garbage collection beginning with that element and moving through the static area.

The identification of the element in the static area with which to begin garbage collection may be performed using a pointer to the head of the linked list and an offset into the linked list determined based on a known size of the add/remove area. Alternatively, the identification of the element in the static area with which to being garbage collection may be performed by filling the add/remove area with dummy elements and identifying and maintaining a pointer to a first dummy element added to the add/remove area. The elements that were present in the linked list before adding the first dummy element may be identified as the static area of the linked list and garbage collection may be performed on those elements.

In an alternative embodiment, to remove an element from a linked list, a "next element" pointer in a previous list element is set to point to the element being deleted's "next element" pointer. As a result, any process following the linked list will not find the element being deleted. Any global references to the element being deleted must be removed.

A message may then be issued to the processors of a multiprocessor system at a same interrupt priority as a reading process priority. When the processors handle the message, the processing of the message indicates that the processor does not hold any local variables that reference the linked list. Once all the processors respond to the message, garbage collection may be performed on the element to be deleted.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides methods and apparatus for removing elements from a linked list in a multiprocessor system such that processors may continue to access elements of the linked list during removal of other elements of the linked list. The present invention may be implemented on any multiprocessor system, whether such processors are located in the same or different computing devices. Thus, the present invention may be used in a stand alone computing device in which multiple processors are present, or in a distributed data processing system in which one or more processors are present in remotely located devices. For ease of explanation, the present invention will be described in terms of a single computing device in which multiple processors are present. However, no limitation to the environment in which the present invention may be implemented is intended or implied by the selection of this illustration of the present invention.

Figure 1:
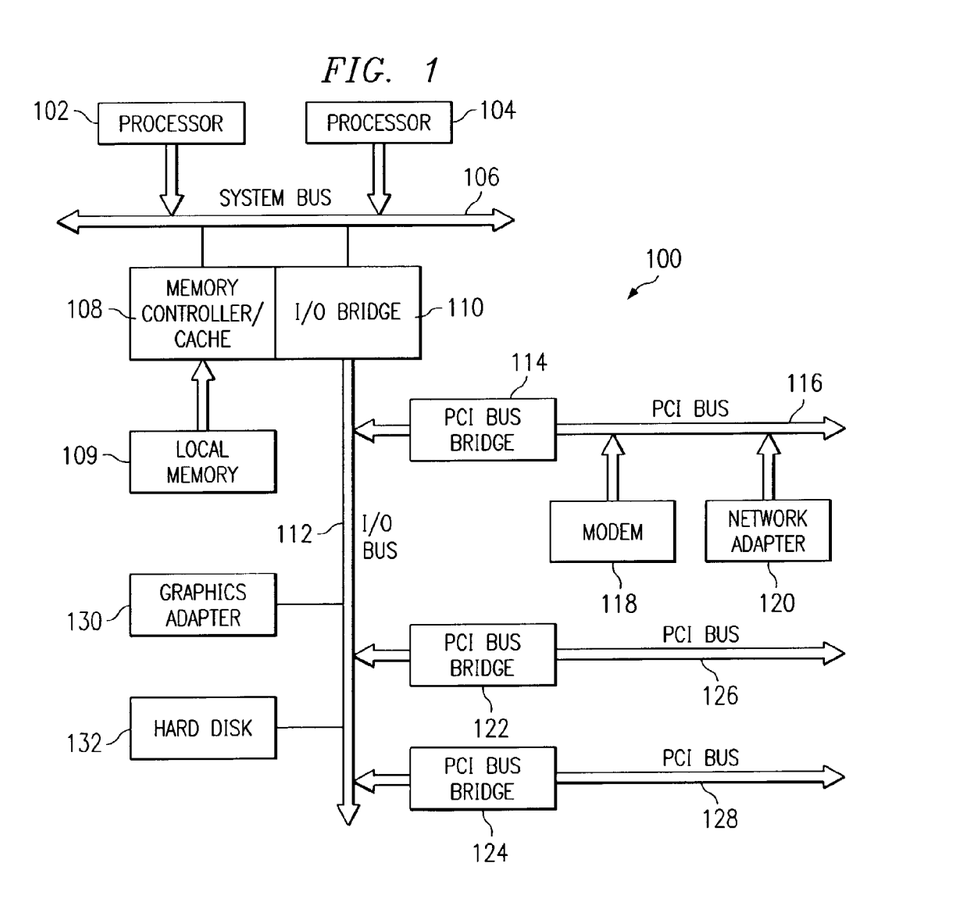
FIG. 1 is an exemplary block diagram of a multiprocessor system in which the present invention may be utilized.

FIG. 1 is an exemplary diagram illustrating a multiprocessor system in which the present invention may be implemented. As shown in FIG. 1, data processing system 100 may be a symmetric multiprocessor (SMP) system including a plurality of processors 102 and 104 that are connected to system bus 106. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communications links to clients may be provided through modem 118 and network adapter 120 connected to PCI local bus 116 through add-in boards.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

The data processing system depicted in FIG. 1 may be, for example, an IBM eServer pSeries system, a product of International Business Machines Corporation in Armonk, N.Y., running the Advanced Interactive Executive (AIX) operating system or LINUX operating system. However, those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
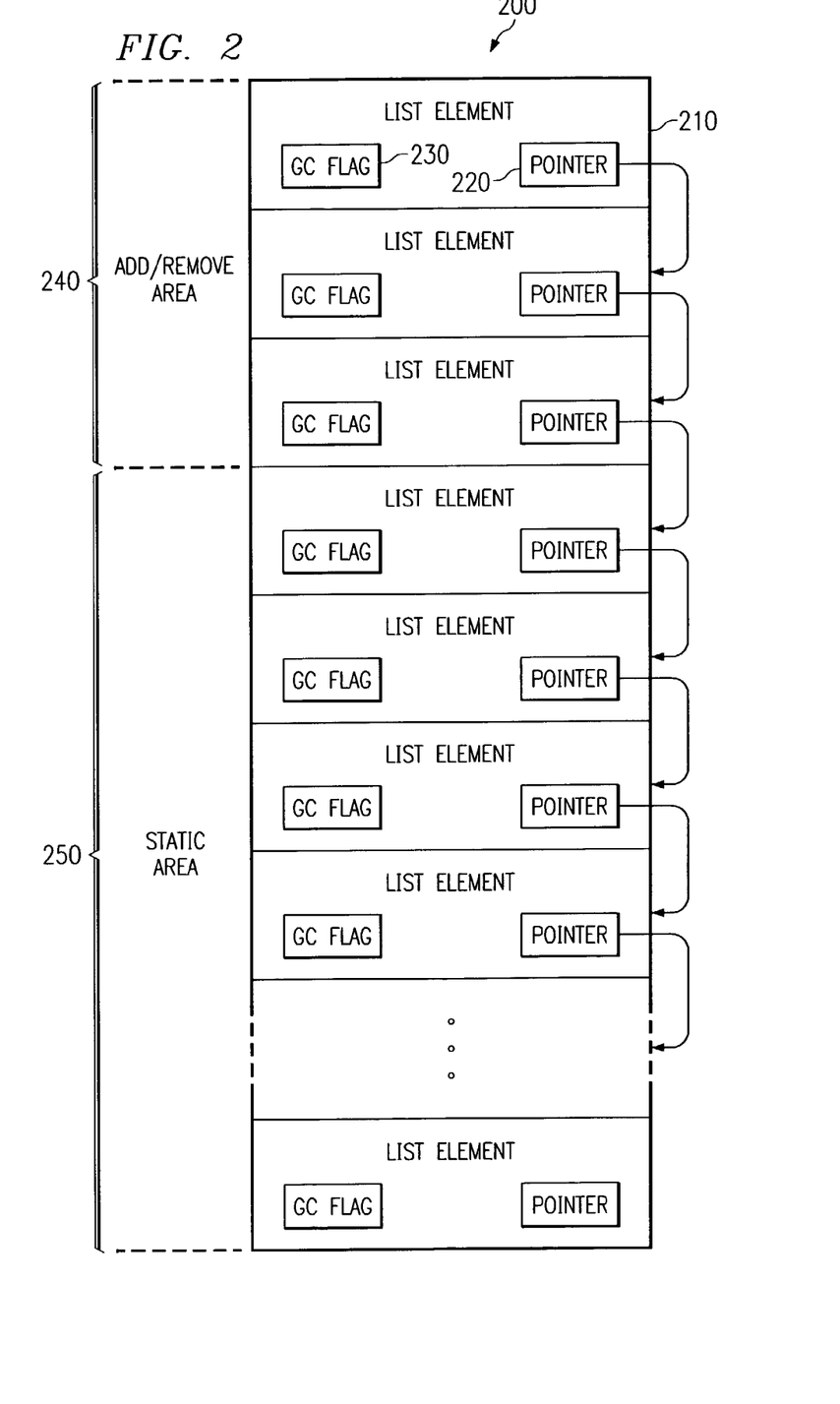
FIG. 2 is an exemplary diagram illustrating a linked list according to one embodiment of the present invention.

FIG. 2 is an exemplary diagram illustrating a linked list according to the present invention. As shown in FIG. 2, the linked list 200 is comprised of one or more list elements 210. The list elements 210 may simply be pointers to data, may include the data itself, or may be more complex data structures having pointers, data, and other information appropriate to the particular implementation.

In the depicted example, the list elements 210 include a pointer data structure 220 that points to a next element in the linked list. The list elements 210 further include a garbage collection flag data structure 230 which is used to mark list elements for garbage collection, as discussed hereafter. The list elements 210 may include other data structures not explicitly shown in FIG. 2. It should be appreciated that while FIG. 2 illustrates the linked list 200 as a top-down linked list, the opposite configuration, a bottom-up linked list, may be utilized without departing from the spirit and scope of the present invention.

In order to remove list elements 210 from the linked list 200 while allowing for simultaneous addition and/or removal of other list elements, i.e. performing removal of linked list elements 210 without obtaining a lock on the linked list 200, it is important to distinguish an area of the linked list 200 that is changing, i.e. an add/remove area where linked list elements are added and/or removed, and an area of the linked list 200 that is not changing, i.e. a static area 250.

In order to identify an add/remove area 240 and a static area 250 of a linked list 200, the present invention ensures that elements are only added to the linked list 200 within a certain region, e.g., the first three elements of the linked list 200. With the present invention, atomic operations are used to add elements from a linked list 200 in only a predefined area, e.g., the first element of the linked list 200 (either at the head or tail of the linked list), the first three elements of the linked list, or the like. An atomic operation is an operation that must be performed entirely or not at all. For example, if machine failure prevents an atomic operation to be processed to completion, the system will be rolled back to the start of the atomic operation.

In addition, the present invention ensures that elements are never removed from the linked list 200 except by a garbage collector or if they are known to be within the add/remove area 240 during the entire garbage collection process. The ensuring of removal only by the garbage collector or in the add/remove area 240 may be performed in a number of different ways as detailed hereafter.

If elements are only added to the linked list 200 in the add/remove area 240 and elements are only removed from the linked list 200 by either the garbage collector or if they are only removed from the add/remove area 240, then the linked list 200 structure will be static everywhere except within the add/remove area 240. Therefore, by ensuring the limitations on addition and removal of elements from the linked list 200 according to the present invention, an add/remove area 240 may be defined and the remainder of the linked list 200 may be considered a static area 250.

The actual removal of elements from the static area 250 of the linked list 200 is performed by a garbage collector. A garbage collector is a software routine or method that searches the linked list 200 for linked list elements 210 that are no longer being used by any processor in the multiprocessor system and reclaims those linked list 200 elements for reuse. The garbage collector of the present invention may be asynchronous with regard to the adding and removing of elements in the add/remove area 240.

Garbage collection and garbage collectors are generally known in the art. The present invention uses a modified version of known garbage collectors in that the garbage collector of the present invention begins operation at a particular point—an element of the static area 250, and does not perform garbage collection on the add/remove area 240.

The garbage collector of the present invention only considers those elements flagged for garbage collection, i.e. have the garbage collection flag data structure 230 set, which are in the static area 250 of the linked list 200 in order to ensure that the elements being removed are not subject to change by one or more of the processors in the multiprocessor system. There a number of different ways in which only the elements in the static area 250 are considered rather than the entire linked list 200.

Figure 3:
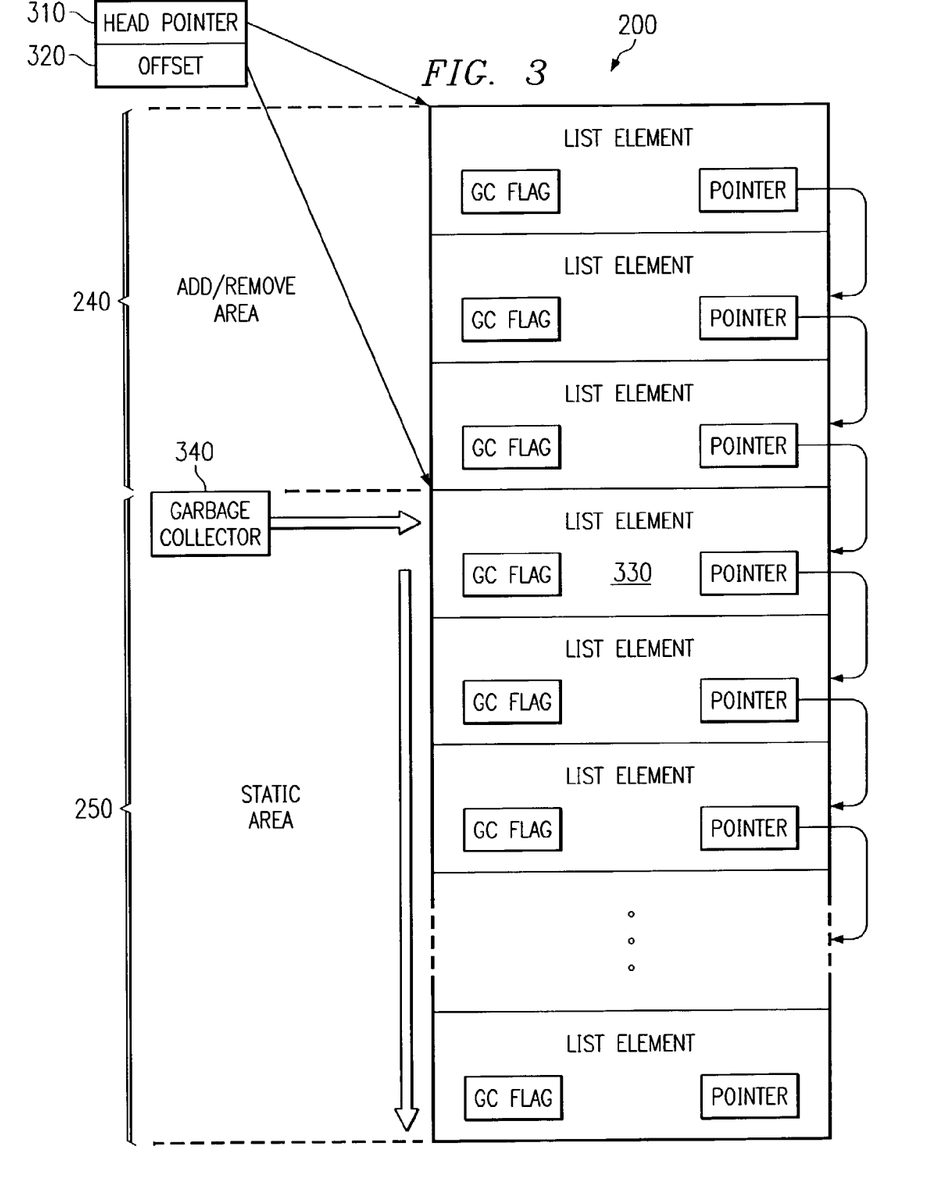
FIG. 3 is an exemplary diagram of a first mechanism for removal of elements from a linked list in accordance with the present invention.

A first exemplary mechanism for garbage collection of only those elements in the static area 250 is shown in FIG. 3. In this first exemplary mechanism, the identification of the element in the static area 250 with which to begin garbage collection is performed using a pointer 310, which may be stored in a data structure associated with the linked list 200, to the head of the linked list 200 and an offset 320 into the linked list 200 determined based on a known size of the add/remove area 240, which may also be stored in the data structure associated with the linked list 200. Using this pointer 310 and offset 320, an element 330 in the static area 250 may be identified.

The garbage collector 340 of the present invention may then access this pointer 310 and offset 320 to identify the element 330. Once this starting element 330 is identified, the garbage collector 340 may traverse the elements in the static area 250 of the linked list 200 until a last element 350 in the linked list 200 is encountered. Those elements having their garbage collection flag 230 set will be garbage collected by the garbage collector 340 as it traverses the linked list 200.

In the meantime, while garbage collection is being performed on the static area 250 of the linked list 200, elements may be added and/or removed from the add/remove area 240 of the linked list since a lock on the linked list 200 has not been acquired. In this way, processors may continue to access the linked list 200 without having their accesses synchronized. As a result, the performance losses due to synchronization experienced in prior art mechanisms for removing elements from a linked list are avoided.

Figure 4:
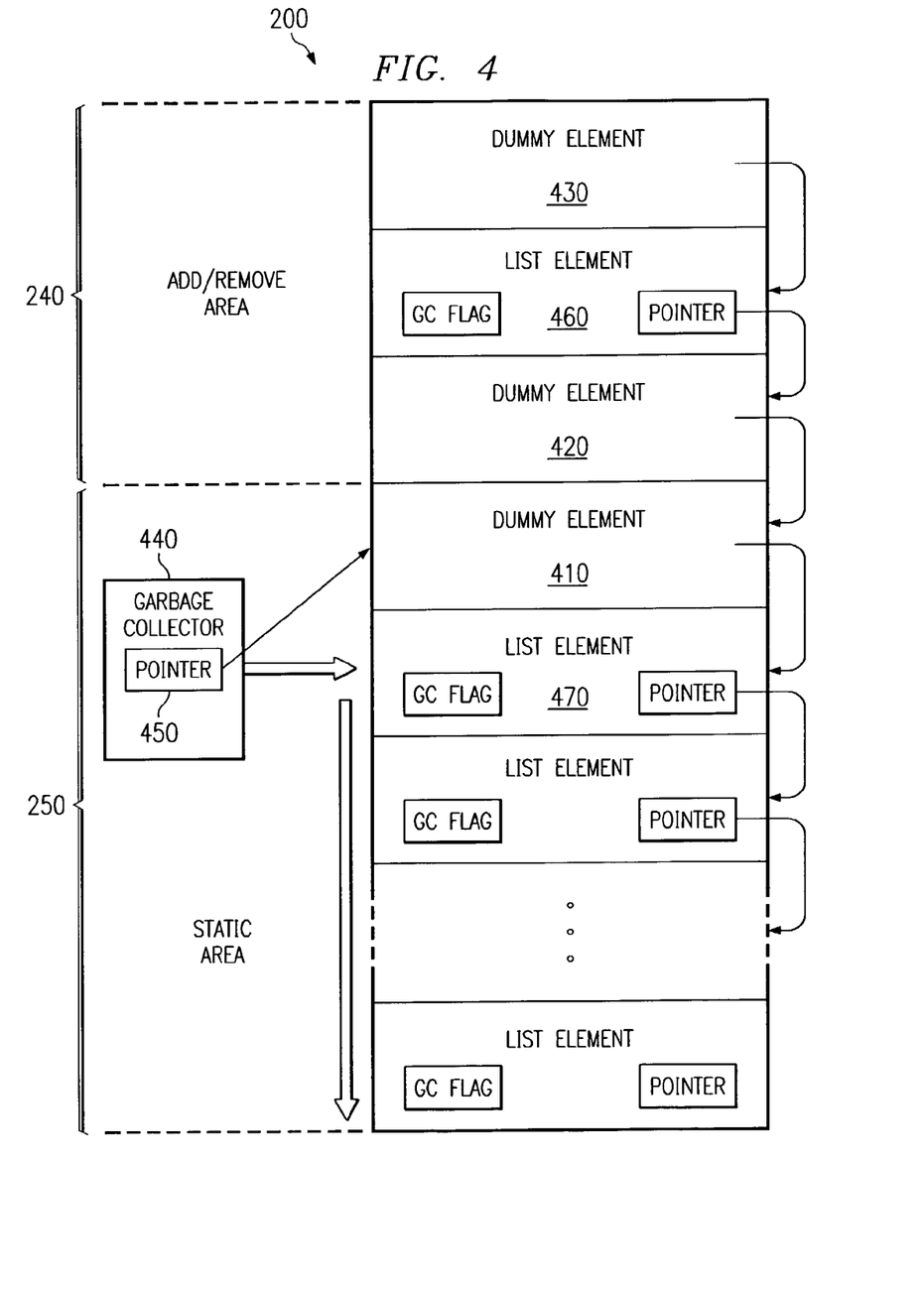
FIG. 4 is an exemplary diagram of a second mechanism for removal of elements from a linked list in accordance with the present invention.

FIG. 4 shows an alternative mechanism for identifying a starting point with which to begin garbage collection according to the present invention. As shown in FIG. 4, dummy elements 410-430 are added to the linked list 200 in the add/remove area 240. The garbage collector 440 maintains a pointer 450 to the first dummy element 410 added to the linked list and continues to add dummy elements up to a known size of the add/remove area.

While these dummy elements 410-430, are added, additional linked list elements may be added in the add/remove area 240, such as element 460. The addition of these linked list elements may push dummy elements, such as dummy element 410, into the static area 250. As a result, the garbage collection may not begin with the first element in the static area 250 and may actually begin with an element further down the list in the static area 250.

Once the dummy elements 410-430 are added, the garbage collector 440 starts garbage collection at the element 470 after the first dummy element 410 added (or before the first dummy element if a bottom-up linked list is utilized). The garbage collection may then continue through the list of elements in the static area 250 of the linked list 200.

Other mechanisms for identifying a starting element from which to begin garbage collection may be utilized without departing from the spirit and scope of the present invention. The key concept of the present invention is that such garbage collection may be performed virtually simultaneously with addition and/or removal of other elements in the linked list. As a result, a lock on the entire linked list is not required to perform garbage collection.

Figure 5:
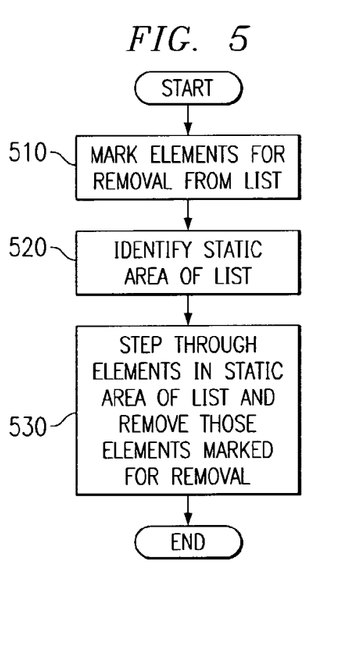
FIG. 5 is a flowchart outlining an exemplary operation of the present invention according to an exemplary embodiment.

FIG. 5 is a flowchart outlining an exemplary operation of an embodiment of the present invention. As shown in FIG. 5, the operation starts with marking of elements for removal from the linked list (step 510). Such marking may involve, for example, setting a garbage collection flag associated with the linked list elements that are to be removed.

Thereafter, a static area of the linked list is identified and thus, an element from which to start garbage collection is identified (step 520). This may be done in any of a number of different ways including using a pointer and offset or a pointer to a first added dummy entry, as described previously.

Finally, the elements in the static area of the linked list are stepped through by the garbage collector and those marked for removal are removed (step 530) and the operation ends. While FIG. 5 illustrates these steps 510-530 as one contiguous method, in actuality the steps 510-530 may be performed as part of different stages of processing and may be performed at different times. For example, step 510 may be performed synchronously and may not be part of the actual garbage collection stage. Similarly, steps 520 and 530 may be performed at a different time from when the elements in the list are marked for removal and may be performed repeatedly.

Figure 6:
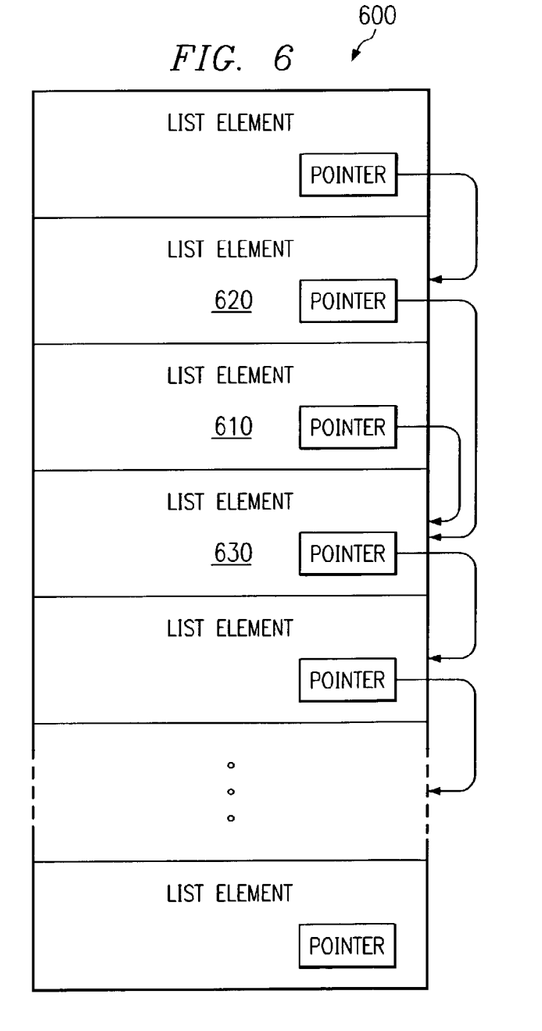
FIG. 6 is an exemplary diagram illustrating a third mechanism for removal of elements from a linked list in accordance with the present invention.

An alternative mechanism may be used for removal of elements from a linked list as depicted in FIG. 6. As shown in FIG. 6, when an element 610 is to be removed from a linked list 600, the "next element" pointer of the element 620 preceding the element 610 to be removed (or after the element to be removed if a bottom-up linked list is utilized) is set to the "next element" pointer of the element 610 to be removed. As a result, the element 620 now points to the element 630 after the element 610 to be removed (or before the element to be removed if a bottom-up linked list is utilized). As a result, any process traversing the linked list after this modification will not encounter the element 610.

After having modified the pointers of the elements in this manner, the garbage collector then removes any global references to the element being removed (generally by replacing them with a reference to the successor in the linked list). Next the garbage collector broadcasts a message to all of the processors in the multiprocessor system. The message is preferably an interrupt message at an interrupt priority level which is the same as read processes for reading elements of the linked list. Thus, the processors can only receive and handle the message when the processor is at a less favored interrupt priority.

Each message broadcast has a message handler, i.e. code that runs when the message is received, associated with it. When the message is received by each processor they call this code associated with the message and then return a response to the processor that sent the message. For purposes of the present invention, the message handler need only return a response to the broadcast message.

Once the message is sent, the garbage collector then awaits a response from each of the processors. Once each of the processors responds, it is known that there are not local variables on the processors that hold a pointer to the element being removed. It is known that no local variable holds a pointer to the element being removed because the only place in which local variables get pointers to elements of the list are at some favored priority. The ability to get to the item being removed via the list has been removed since the pointers in the list elements have been modified so that the element being removed is not accessed. In addition, global pointers to the element have been removed. Furthermore, because each processor responded to the message broadcast, each processor was at least temporarily at an interrupt priority less favored than that used to examine the list. Thus, after responding to the message, each processor then has no way of getting a pointer to the element being removed. Since there is no local variable that holds a pointer to the element being removed, the garbage collector may remove the element 610.

Figure 7:
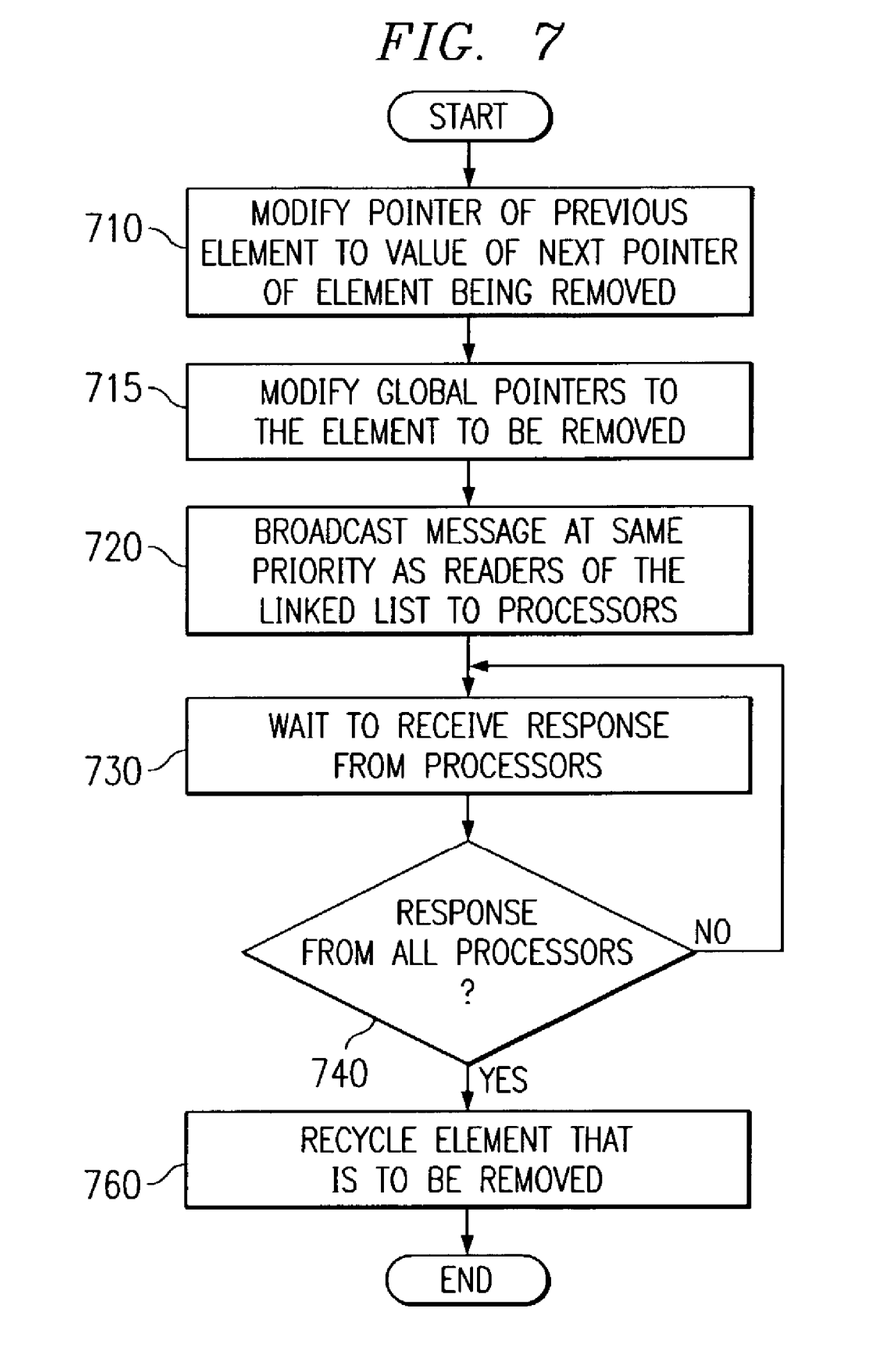
FIG. 7 is a flowchart outlining an exemplary operation of the present invention according to the third mechanism of FIG. 6.

FIG. 7 is a flowchart outlining an exemplary operation of the present invention according to this alternative embodiment. As shown in FIG. 7, the operation starts with modifying a pointer of a previous element to have a value of a next pointer of the element being removed (step 710). Global pointers to the element being removed are modified to point to another element of the list (generally the next element) (step 715).

A message is then broadcast to the processors of the multiprocessor system (step 720) and the operation waits to receive a response from each of the processors (step 730). A determination is made as to whether each processor has responded to the broadcast message (step 740). If all processors have not responded then the operation returns to step 730 and continues to wait for responses from all processors. Once all processors have responded, the element is recycled (step 760). The operation then ends.

Thus, the present invention provides apparatus, methods and computer program products for removal of elements from a linked list which allow for accessing of other elements in the list at substantially the same time as the removal of the elements. In this way, the performance penalties due to having to lock or otherwise protect the linked list from alteration during the removal process are avoided.

While the present invention has been described in terms of a top-down linked list or a bottom-up linked list, the present invention is not limited to such. Rather, any manner of providing a linked list is intended to be within the spirit and scope of the present invention. Thus, linked lists in which elements are added to a middle portion of the linked list may be included in the scope of the present invention. Other ways in which linked lists are implemented are also included.

Moreover, while the present invention has been described in terms of alternative approaches to performing removal of elements in a linked list, the invention is not limited to such.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments described above were chosen and described in order to best explain the principles of the invention, the practical application, and to enable others of ordinary skill in the art to understand the invention for various embodiments with various modifications as are suited to the particular use contemplated.

What is claimed is:

1. A computer implemented method, in a data processing system, for removing elements from a linked list in a memory device, comprising:

identifying at least one first element of a plurality of elements in the linked list for removal;

identifying a static area and an add/remove area of the linked list;

removing the at least one first element from the static area of the linked list; and permitting an application to modify at least one second element of the plurality of elements in the add/remove area of the linked list while preventing the application from modifying at least one third element of the plurality of elements in the static area of the linked list during the removal of the at least one first element from the static area of the linked list.

2. The computer implemented method of claim 1, wherein identifying the at least one first element of the plurality of elements in the linked list for removal includes setting a garbage collection flag data structure of the at least one first element.

3. The computer implemented method of claim 1, wherein removing the at least one first element from the static area of the linked list includes:

traversing the static area of the linked list to identify the at least one first element; and performing garbage collection on the at least one first element.

4. The computer implemented method of claim 1, wherein identifying the static area of the linked list includes identifying an element of the plurality of elements whose position in the linked list is after a last element in the add/remove area of the linked list.

5. The computer implemented method of claim 1, wherein identifying the static area of the linked list includes:

adding one or more dummy elements to the linked list; and identifying the static area as all elements of the plurality of elements in the linked list that are not dummy elements.

6. The computer implemented method of claim 5, wherein a number of dummy elements to be added to the linked list is determined based on a size of the add/remove area.

7. The computer implemented method of claim 1, wherein removing the at least one first element from the static area of the linked list includes:

modifying a pointer of a previous element in the linked list, appearing prior to the at least one first element to be removed, that points to a next element in the linked list to point to an element after the at least one element to be removed.

8. The computer implemented method of claim 7, wherein removing the at least one first element from the static area of the linked list further includes:

broadcasting a message to one or more processors of the data processing system;

receiving a response from each of the one or more processors; and removing the at least one first element from the static area of the linked list in response to receipt of a response from each of the one or more processors.

9. The computer implemented method of claim 8, wherein the message is an interrupt having an interrupt priority that is the same as a read operation priority for reading information from the linked list.

10. The computer implemented method of claim 4, wherein identifying the element of the plurality of elements whose position in the linked list is after the last element in the add/remove area of the linked list includes:
identifying a head of the add/remove area of the linked list;
identifying an offset into the linked list based on a size of the add/remove area of the linked list; and
identifying the element of the plurality of elements whose position in the linked list is after the last element in the add/remove area based on the head of the add/remove area and the offset.

11. A computer program product in a computer storage medium for removing elements from a linked list in a memory device, comprising:
first instructions for identifying at least one first element of a plurality of elements in the linked list for removal;
second instructions for identifying a static area and an add/remove area of the linked list;
third instructions for removing the at least one first element from the static area of the linked list; and
fourth instructions for permitting an application to modify at least one second element of the plurality of elements in the add/remove area of the linked list while preventing the application from modifying at least one third element of the plurality of elements in the static area of the linked list during the removal of the at least one first element from the static area of the linked list.

12. The computer program product of claim 11, wherein the first instructions for identifying the at least one first element of the plurality of elements in the linked list for removal include instructions for setting a garbage collection flag data structure of the at least one first element.

13. The computer program product of claim 11, wherein the third instructions for removing the at least one first element from the static area of the linked list include:
instructions for traversing the static area of the linked list to identify the at least one first element; and
instructions for performing garbage collection on the at least one first element.

14. The computer program product of claim 11, wherein the instructions for identifying the static area of the linked list include instructions for identifying an element of the plurality of elements whose position in the linked list is after a last element in the add/remove area of the linked list.

15. The computer program product of claim 11, wherein the instruction for identifying the static area of the linked list include:
instructions for adding one or more dummy elements to the linked list; and
instructions for identifying the static area as all elements of the plurality of elements in the linked list that are not dummy elements.

16. The computer program product of claim 15, wherein a number of dummy elements to be added to the linked list is determined based on a size of the add/remove area.

17. The computer program product of claim 11, wherein the third instructions for removing the at least one first element from the static area of the linked list include:
instructions for modifying a pointer of a previous element in the linked list, appearing prior to the at least one first element to be removed, that points to a next element in the linked list to point to an element after the at least one element to be removed.

18. The computer program product of claim 17, wherein the third instructions for removing the at least one first element from the static area of the linked list further include:
instructions for broadcasting a message to one or more processors of the data processing system;
instructions for receiving a response from each of the one or more processors; and
instructions for removing the at least one first element from the static area of the linked list in response to receipt of a response from each of the one or more processors.

19. The computer program product of claim 18, wherein the message is an interrupt having an interrupt priority that is the same as a read operation priority for reading information from the linked list.

20. The computer program product of claim 14, wherein the instructions for identifying the element of the plurality of elements whose position in the linked list is after the last element in the add/remove area of linked list include:
instructions for identifying a head of the add/remove area of the linked list;
instructions for identifying an offset into the linked list based on a size of the add/remove area of the linked list; and
instructions for identifying the element of the plurality of elements whose position in the linked list is after the last element in the add/remove area based on the head of the add/remove area and the offset.

21. An apparatus having a processor in a data processing system for removing elements from a linked list in a memory device, comprising:
means for identifying at least one first element of a plurality of elements in the linked list for removal;
means for identifying a static area and an add/remove area of the linked list;
means for removing the at least one first element from the static area of the linked list; and
means for permitting an application to modify at least one second element of the plurality of elements in the add/remove area of the linked list while preventing the application from modifying at least one third element of the plurality of elements in the static area of the linked list during the removal of the at least one first element from the static area of the linked list.

22. The apparatus of claim 21, wherein the means for identifying the at least one first element of the plurality of elements in the linked list for removal includes means for setting a garbage collection flag data structure of the at least one first element.

23. The apparatus of claim 21, wherein the means for removing the at least one first element from the static area of the linked list includes:
means for traversing the static area of the linked list to identify the at least one first element; and
means for performing garbage collection on the at least one first element.

24. The apparatus of claim 21, wherein the means for identifying the static area of the linked list includes means for identifying an element of the plurality of elements whose position in the linked list is after a last element in the add/remove area of the linked list.

25. The apparatus of claim 21, wherein the means for identifying the static area of the linked list includes:
- means for adding one or more dummy elements to the linked list; and
- means for identifying the static area as all elements of the plurality of elements in the linked list that are not dummy elements.

26. The apparatus of claim 25, wherein a number of dummy elements to be added to the linked list is determined based on a size of the add/remove area.

27. The apparatus of claim 21, wherein the means for removing the at least one first element from the static area of the linked list includes:
- means for modifying a pointer of a previous element in the linked list, appearing prior to the at least one first element to be removed, that points to a next element in the linked list to point to an element after the at least one element to be removed.

28. The apparatus of claim 27, wherein the means for removing the at least one first element from the static area of the linked list further includes:
- means for broadcasting a message to one or more processors of the data processing system;
- means for receiving a response from each of the one or more processors; and
- means for removing the at least one first element from the static area of the linked list in response to receipt of a response from each of the one or more processors.

29. The apparatus of claim 28, wherein the message is an interrupt having an interrupt priority that is the same as a read operation priority for reading information from the linked list.

30. The apparatus of claim 24, wherein the means for identifying the element of the plurality of elements whose position in the linked list is after the last element in the add/remove area of the linked list includes:
- means for identifying a head of the add/remove area of the linked list;
- means for identifying an offset into the linked list based on a size of the add/remove area of the linked list; and
- means for identifying the element of the plurality of elements whose position in the linked list is after the last element in the add/remove area based on the head of the add/remove area and the offset.

31. A system for removing elements from a linked list in a memory device, comprising:
- a first processor that identifies at least one first element of a plurality of elements in the linked list for removal;
- a second processor identifies a static add/remove area of the linked list;
- a garbage collector that removes the at least one first element from the static area of the linked list; and
- a third processor that permits an application to modify at least one second element of the plurality of elements in the add/remove area of the linked list while preventing the application from modifying at least one third element of the plurality of elements in the static area of the linked list during the removal of the at least one first element by the garbage collector from the static area of the linked list.

32. The system of claim 31, wherein the first processor sets a garbage collection flag data structure of the at least one first element.

33. The system of claim 31, wherein the garbage collector traverses the static area of the linked list to identify the at least one first element, and performs garbage collection on the at least one first element.

34. The system of claim 31, wherein the second processor identifies the static area by identifying an element of the plurality of elements whose position in the linked list is after a last element in the add/remove area of the linked list.

35. The system of claim 31, wherein the second processor identifies the static area by addition of one or more dummy elements to the linked list and identifying the static area as all elements of the plurality of elements in the linked list that are not dummy elements.

36. The system of claim 35, wherein a number of dummy elements to be added to the linked list is determined based on a size of the add/remove area.

37. The system of claim 31, wherein the first processor modifies a pointer of a previous element in the linked list, appearing prior to the at least one first element to be removed from the static area of the linked list, that points to a next element in the linked list to point to an element after the at least one element to be removed from the static area of the linked list.

38. The system of claim 37, wherein the first processor broadcasts a message to one or more processors of the data processing system, receives a response from each of the one or more processors, and instructs the garbage collector to remove the at least one first element from the static area of the linked list in response to receipt of a response from each of the one or more processors.

39. The system of claim 38, wherein the message is an interrupt having an interrupt priority that is the same as a read operation priority for reading information from the linked list.

40. The system of claim 34, wherein the garbage collector identifies the element of the plurality of elements whose position in the linked list is after the last element in the add/remove area of the linked list by:
- identifying a head of the add/remove area of the linked list;
- identifying an offset into the linked list based on a size of the add/remove area of the linked list; and
- identifying the element of the plurality of elements whose position in the linked list is after the last element in the add/remove area based on the head of the add/remove area and the offset.

* * * * *